United States Patent [19]

Judge et al.

[11] Patent Number: 5,739,676
[45] Date of Patent: Apr. 14, 1998

[54] MULTIPLE-ALTERNATOR ELECTRICAL SYSTEM

[75] Inventors: Alan Francis Judge, Farmington Hills; Brent S. Williams, Canton, both of Mich.

[73] Assignee: Ford Motor Company, Dearborn, Mich.

[21] Appl. No.: 744,079

[22] Filed: Nov. 4, 1996

[51] Int. Cl.$^6$ .................................................. H02P 9/14
[52] U.S. Cl. ................................ 322/22; 322/90; 322/28
[58] Field of Search ............................... 322/28, 22, 12, 322/90

[56] References Cited

U.S. PATENT DOCUMENTS

| | | | |
|---|---|---|---|
| 2,504,768 | 4/1950 | Watson et al. | 290/4 |
| 3,543,126 | 11/1970 | Nolan et al. | 320/39 |
| 3,809,996 | 5/1974 | Meisenheimer | 322/28 |
| 3,852,653 | 12/1974 | Kuroda et al. | 320/64 |
| 4,156,836 | 5/1979 | Wiley | 320/65 |
| 4,336,485 | 6/1982 | Stroud | 320/15 |
| 4,347,473 | 8/1982 | Stroud | 320/15 |
| 4,454,464 | 6/1984 | Stroud | 322/28 |
| 4,459,489 | 7/1984 | Kirk et al. | 290/13 |
| 4,509,005 | 4/1985 | Stroud | 320/68 |
| 4,539,515 | 9/1985 | Morishita et al. | 320/17 |
| 4,604,565 | 8/1986 | Yokota et al. | 320/15 |
| 4,788,486 | 11/1988 | Mashino et al. | 320/17 |
| 4,829,228 | 5/1989 | Buetemeister | 322/27 |
| 5,097,165 | 3/1992 | Mashino et al. | 310/112 |
| 5,233,229 | 8/1993 | Kohl et al. | 307/10.1 |
| 5,254,936 | 10/1993 | Leaf et al. | 322/90 |
| 5,418,401 | 5/1995 | Kaneyuki | 307/10.1 |
| 5,424,599 | 6/1995 | Stroud | 310/198 |
| 5,444,355 | 8/1995 | Kaneyuki et al. | 322/58 |
| 5,600,232 | 2/1997 | Eavenson, Sr. et al. | 322/12 |

FOREIGN PATENT DOCUMENTS

| | | |
|---|---|---|
| 2101270 | 7/1972 | Germany. |
| 608227 | 5/1978 | U.S.S.R. . |

*Primary Examiner*—Steven L. Stephan
*Assistant Examiner*—Nicholas Ponomarenko
*Attorney, Agent, or Firm*—Mark S. Sparschu

[57] ABSTRACT

In one embodiment of the present invention, an electrical generating system for a motor vehicle includes a first alternator and a second alternator. The first alternator includes a first plurality of electrical power output windings, a first field winding in electromagnetic communication with the first plurality of electrical power output windings and a voltage regulator. The voltage regulator further includes an electrical driver coupled to the first field winding to control a current through the first field winding. The second alternator includes a second alternator further including a second plurality of electrical power output windings and a second field winding in electromagnetic communication with the second plurality of electrical power output windings. The said second field winding is coupled to the electrical driver for control of electrical current through the second field winding by the electrical driver. Systems according to the present invention can provide the enhanced electrical output of multiple alternator systems without "fighting" between voltage regulators of the alternators for control. Such systems can also provide diagnostics to monitor the operation of each alternator.

13 Claims, 1 Drawing Sheet

MULTIPLE-ALTERNATOR ELECTRICAL SYSTEM

BACKGROUND OF THE INVENTION

1. Field of the Invention

The present invention relates to electrical power generation systems for motor vehicles.

2. Description of the Related Art

Some motor vehicles have accessories with particularly high electrical loads. An example of one such motor vehicle is an ambulance. In motor vehicles with high electrical loads, generating the electrical power required can be a challenge.

One possible way to generate the electrical power required is through the use of a very high capacity alternator. However, the larger the power generating capability an alternator has, the larger the physical volume the alternator will occupy. Packaging constraints in many motor vehicles preclude the use of a single, very large alternator.

An alternative way to generate the required electrical power is through the use of two or more smaller alternators. The smaller alternators, although perhaps occupying a greater total physical volume than a single larger alternator, provide greater packaging flexibility. That is, space may be more readily available for two smaller alternators than for one large alternator.

One way which has been proposed for mechanizing a multiple alternator system involves simply connecting the direct current (DC) power outputs of the alternators in parallel. However, because each alternator carries a voltage regulator which independently controls the field current through the alternator's field coil, the two alternators thus configured can "fight". That is, the regulator of one alternator might try to reduce the output voltage of the alternator, while the regulator of a second alternator might try to increase the output voltage of that alternator. The result is an unstable condition.

In addition to controlling alternator output by controlling field current, a typical voltage regulator further performs some valuable diagnostics related to the alternator being controlled by the voltage regulator. For example, the voltage regulator may contain circuitry which senses whether the power output windings of the alternator are generating any power. If one or more of the diagnostic tests performed by the voltage regulator fail, the regulator can light a diagnostic lamp located on the vehicle dashboard. Such diagnostic tests are quite valuable to inform the vehicle's driver of a fault in the vehicle's electrical generating system.

Therefore, a multiple alternator system which can avoid "fighting" between the alternators and which also provides diagnostics for each of the alternators can prove very advantageous.

SUMMARY OF THE INVENTION

The present invention provides an electrical generating system for a motor vehicle. The system comprises a first alternator further including a first plurality of electrical power output windings, a first field-generating winding in electromagnetic communication with the first plurality of electrical power output windings and a voltage regulator. The voltage regulator further includes an electrical driver coupled to the first field-generating winding to control a current through the first field-generating winding. The system also includes a second alternator further including a second plurality of electrical power output windings and a second field-generating winding in electromagnetic communication with the second plurality of electrical power output windings. The second field-generating winding is coupled to the electrical driver for control of electrical current through the second field-generating winding by the electrical driver.

The present invention also provides a second electrical generating system for a motor vehicle. The system comprises a first alternator further including a first plurality of electrical power output windings and a first field-generating winding in electromagnetic communication with the first plurality of electrical power output windings. Additionally, the system includes a second alternator further including a second plurality of electrical power output windings and a second field-generating winding in electromagnetic communication with the second plurality of electrical power output windings. Further, the system comprises an electrical driver electrically coupled in parallel to the first field generating winding and the second field generating winding to control currents through the first field generating winding and the second field generating winding.

Multiple-alternator electrical generating systems according to some embodiments of the present invention can provide enhanced electrical power output without the "fighting" experienced in other multiple-alternator systems. Further, diagnostics for the operation of each alternator can be provided.

DETAILED DESCRIPTION OF THE PREFERRED EMBODIMENT

Figure 1:
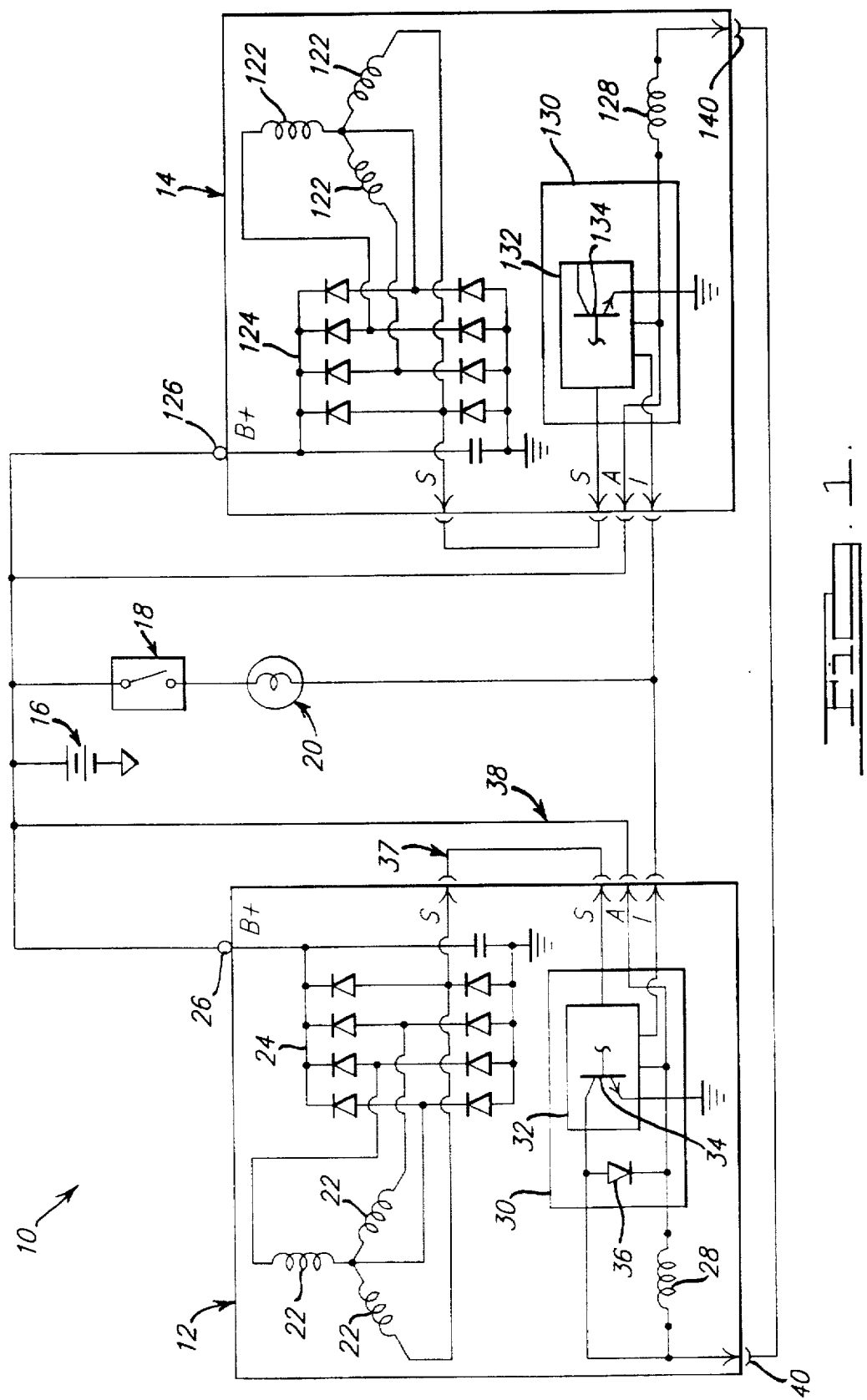
FIG. 1 is an electrical schematic drawing of electrical generating system 10 according to one embodiment of the present invention.

Referring to FIG. 1, a multiple alternator system 10 according to one embodiment of the present invention will be described. The system includes a first alternator 12 and a second alternator 14. The system also includes one or more vehicle batteries 16, typically though not necessarily 12-volt batteries. Additionally, the system includes an ignition switch 18 and a generating system diagnostic indicator 20.

Alternator 12 further includes three power output windings 22. As is apparent, alternator 12 is a three-phase machine, though the present invention is not so limited. Alternator 12 also includes a rectifier 24. Rectifier 24 includes diodes which rectify the alternating current (AC) outputs of power output windings 22 into direct current (DC) at DC power output 26 of alternator 12. Alternator 12 also includes a field coil 28, which is in electromagnetic communication with power output windings 22.

Also included in alternator 12 is a voltage regulator 30. Voltage regulator 30 includes circuitry 32 which further includes an electrical driver 34. Through sensing the voltage at terminal "A", voltage regulator 30 modulates the current through field coil 28 to maintain the output voltage of alternator 12 (as sensed by terminal "A") at a predetermined target value. Electrical driver 34 is preferably a solid-state device. A flyback diode 36 is also typically provided in voltage regulator 30.

Circuitry 32 in regulator 30 also provides a number of diagnostic functions to determine whether alternator 12 is operating properly. For example, via circuit 37 connecting the two "S" terminals of alternator 12, regulator 30 monitors the output voltage of one of the power output windings 22.

If an alternating voltage (that is, an AC signal) is not detected, regulator 30 concludes that alternator 12 is not generating power. This can be due to a number of causes internal to alternator 12 (e.g., a short circuit or open circuit in a number of places) or external to alternator 12 (e.g., the belt which mechanically drives alternator 12 being broken). Another diagnostic function performed by regulator 30 is monitoring the voltage at the "A" terminal. If the voltage is very high (above, say, 20 volts or so in a 12-volt system), an overvoltage condition at output 26 of alternator 12 is indicated.

In the event that any of the above diagnostic tests indicate a malfunction, voltage regulator 30 lights generating system diagnostic indicator 20 to inform the vehicle's driver of the malfunction. Generating system diagnostic indicator 20 can be a simple light bulb on the dashboard of the vehicle or a more complex driver information center.

It should be emphasized here that voltage regulator 30 is a conventional voltage regulator well-known in the art. Such a voltage regulator 30 is used, for example, on numerous car and truck models manufactured by Ford Motor Company.

Alternator 14 further comprises three power output windings 122 and a rectifier 124. Alternator 14 also includes a DC power output 126 and a field coil 128. Field coil 128 is in electromagnetic communication with power output windings 122.

Alternator 14 also includes a voltage regulator 130 which can be of generally the same configuration as voltage regulator 30 but for some modifications which will be detailed here. A review of the Figure shows that field coil 128 of alternator 14 is coupled to driver 34 of alternator 12. That is, driver 34 of alternator 12 drives both field coil 28 of alternator 12 and field coil 128 of alternator 14. The modification of voltage regulator 130 to result in this configuration can be selected from a number of possible alternatives. For example, driver 134 can be removed from regulator 130. Also, the circuit trace connecting driver 134 to field coil 128 (as shown between driver 34 and field coil 28 but removed within alternator 14) can be removed. In either event, external terminals 40 and 140 should be added to alternator 12 and alternator 14, respectively, to allow connection of driver 34 of alternator 12 to field coil 128 of alternator 14. Of course, driver 34 must be appropriately sized to drive the currents of both field coil 28 and field coil 128.

Although driver 34 of alternator 12 drives field coil 128 of alternator 14, the diagnostic functions of regulator 130 (the functions described above with respect to regulator 30) are still functional. So, voltage regulator 130 can continue to monitor for proper operation of alternator 14, although voltage regulator 130 no longer controls field coil 128 of alternator 14.

Thus, the system illustrated in the Figure eliminates "fighting" which would occur with other multiple alternator systems. Only one voltage regulator, voltage regulator 30 of alternator 12, monitors the voltage at battery 16 and modulates the current through both field coils 28 and 30 in parallel such that the voltage at battery 16 is maintained at its predetermined target. Further, diagnostics are available for both alternator 12 and alternator 14.

In another embodiment of the present invention, the "T" terminals of both alternators 12 and 14 can be coupled to separate diagnostic indicators.

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

What is claimed is:

1. An electrical generating system for a motor vehicle, said system comprising:

a first alternator further including a first plurality of electrical power output windings, a first field-generating winding in electromagnetic communication with said first plurality of electrical power output windings and a voltage regulator, said voltage regulator further including an electrical driver coupled to said first field-generating winding to control a current through said first field-generating winding; and a second alternator further including a second plurality of electrical power output windings and a second field-generating winding in electromagnetic communication with said second plurality of electrical power output windings, said second field-generating winding coupled to said electrical driver for control of electrical current through said second field-generating winding by said electrical driver.

2. An electrical generating system as recited in claim 1, wherein:

said first alternator has a first electrical power output;

said second alternator has a second electrical power output; and said first electrical power output and said second electrical power output are coupled to provide electrical current in parallel to at least one battery.

3. An electrical generating system as recited in claim 1, wherein:

said first alternator includes a diagnostic input coupled to detect a lack of electrical power output from at least one of said first plurality of electrical power output windings; and said second alternator includes a diagnostic input coupled to detect a lack of electrical power output from at least one of said second plurality of electrical power output windings.

4. An electrical generating system as recited in claim 1, wherein:

said first alternator includes a diagnostic input coupled to detect an overvoltage condition of said first power output; and said second alternator includes a diagnostic input coupled to detect an overvoltage condition of said second power output.

5. An electrical generating system as recited in claim 1, wherein:

said system further comprises at least one generating system diagnostic indicator;

said first alternator includes an output coupled to control a said generating system diagnostic indicator; and said second alternator includes an output coupled to control a said generating system diagnostic indicator.

6. An electrical generating system as recited in claim 5, wherein said system includes exactly one said generating system diagnostic indicator.

7. An electrical generating system as recited in claim 1, wherein:

said system further comprises at least one generating system diagnostic indicator;

said first alternator includes a diagnostic input coupled to detect a lack of electrical power output from at least one of said first plurality of electrical power output windings for indication of said lack of electrical power output via a said generating system diagnostic indicator; and said second alternator includes a diagnostic input coupled to detect a lack of electrical power output from at least one of said second plurality of electrical power output windings for indication of said lack of electrical power output via a said generating system diagnostic indicator.

8. An electrical generating system as recited in claim 7, wherein said system includes exactly one said generating system diagnostic indicator.

9. An electrical generating system as recited in claim 1, wherein:

said system further includes at least one generating system diagnostic indicator;

said first alternator includes a diagnostic input coupled to detect an overvoltage condition of said first power output for indication of said overvoltage condition via a said generating system diagnostic indicator; and said second alternator includes a diagnostic input coupled to detect an overvoltage condition of said second power output for indication of said overvoltage condition via a said generating system diagnostic indicator.

10. An electrical generating system as recited in claim 9, wherein said system includes exactly one said generating system diagnostic indicator.

11. An electrical generating system for a motor vehicle, said system comprising:

a first alternator further including a first plurality of electrical power output windings and a first field-generating winding in electromagnetic communication with said first plurality of electrical power output windings;

a second alternator further including a second plurality of electrical power output windings and a second field-generating winding in electromagnetic communication with said second plurality of electrical power output windings; and an electrical driver electrically coupled in parallel to said first field generating winding and said second field generating winding to control currents through said first field generating winding and said second field generating winding.

12. An electrical generating system as recited in claim 11, wherein:

said first alternator further comprises a first diagnostic input to diagnose proper operation of said first alternator;

said second alternator further comprises a second diagnostic input to diagnose proper operation of said second alternator;

said system further comprises a first diagnostic indicator responsively coupled to indicate faults sensed by said first diagnostic input; and said system further comprises a second diagnostic indicator responsively coupled to indicate faults sensed by said second diagnostic input.

13. An electrical generating system as recited in claim 11, wherein:

said first alternator further comprises a first diagnostic input to diagnose proper operation of said first alternator;

said second alternator further comprises a second diagnostic input to diagnose proper operation of said second alternator; and said system further comprises a diagnostic indicator responsively coupled to indicate faults sensed by said first diagnostic input and said second diagnostic input.

\* \* \* \* \*